US012748366B2

(12) United States Patent
Song et al.

(10) Patent No.: US 12,748,366 B2
(45) Date of Patent: Sep. 29, 2026

(54) FUSING BASED ON BELT TEMPERATURE

(71) Applicant: Hewlett-Packard Development Company, L.P., Spring, TX (US)

(72) Inventors: Jeongchul Song, Seongnam-si (KR); Choongkyu Park, Seongnam-si (KR); Younghoon Han, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/691,781

(22) PCT Filed: Mar. 17, 2022

(86) PCT No.: PCT/US2022/020725

§ 371 (c)(1),
(2) Date: Mar. 13, 2024

(87) PCT Pub. No.: WO2023/043486

PCT Pub. Date: Mar. 23, 2023

(65) Prior Publication Data

US 2024/0377774 A1 Nov. 14, 2024

(30) Foreign Application Priority Data

Sep. 17, 2021 (KR) ........................ 10-2021-0125130

(51) Int. Cl.
*G03G 15/20* (2006.01)

(52) U.S. Cl.
CPC ..... *G03G 15/2039* (2013.01); *G03G 15/2042* (2013.01); *G03G 2215/2035* (2013.01)

(58) Field of Classification Search
CPC ........... G03G 15/2039; G03G 15/2042; G03G 15/2053; G03G 2215/2035; H05B 1/0241; H05B 3/0066
USPC .................................... 399/69, 329; 219/216
See application file for complete search history.

(56) References Cited

U.S. PATENT DOCUMENTS

2011/0135358 A1* 6/2011 Kikuchi ............. G03G 15/2064 399/329
2011/0142472 A1* 6/2011 Mitsuoka ........... G03G 15/2039 399/69
2012/0170957 A1 7/2012 Kim et al.
2015/0050046 A1* 2/2015 Honda ............... G03G 15/2039 399/329
2015/0277306 A1 10/2015 Kondo
2016/0252856 A1* 9/2016 Suzuki ............... G03G 15/2053 399/329
2017/0102645 A1 4/2017 Lee
(Continued)

FOREIGN PATENT DOCUMENTS

CN 102681408 A 9/2012
CN 107065480 A 8/2017
(Continued)

*Primary Examiner* — Robert B Beatty
(74) *Attorney, Agent, or Firm* — Foley & Lardner LLP

(57) ABSTRACT

A fuser includes a heating member, a fusing belt including an inner circumferential surface, the fusing belt to be heated by the heating member by having the inner circumferential surface of the fusing belt in contact with the heating member, a first temperature sensor to sense a first temperature of an outer circumferential surface of the fusing belt, and a second temperature sensor to sense a second temperature of the heating member.

12 Claims, 11 Drawing Sheets

(56) References Cited

U.S. PATENT DOCUMENTS

| | | | | |
|---|---|---|---|---|
| 2019/0384211 | A1* | 12/2019 | Sako | G03G 15/2053 |
| 2020/0174407 | A1* | 6/2020 | Furuichi | G03G 15/2039 |
| 2022/0043377 | A1* | 2/2022 | Endo | G03G 15/2042 |

FOREIGN PATENT DOCUMENTS

| | | | |
|---|---|---|---|
| EP | 3757679 | A1 | 12/2020 |
| JP | 2004-287999 | A | 10/2004 |
| JP | 2008-058645 | A | 3/2008 |
| JP | 2009-075439 | A | 4/2009 |
| JP | 2012-018644 | A | 1/2012 |
| WO | 2021/183235 | A1 | 9/2021 |

* cited by examiner

FUSING BASED ON BELT TEMPERATURE

CROSS-REFERENCE TO RELATED APPLICATIONS

This application is a National Stage Application under 35 U.S.C. § 371 of PCT/US2022/020725, filed Mar. 17, 2022, which claims priority to Korean Patent Application No. 10-2021-0125130, filed Sep. 17, 2021, which are hereby incorporated by reference in their entireties.

BACKGROUND

An image forming apparatus such as a printer, a copier, or a multi-function printer may transfer a print medium loaded in a loading portion to an image forming portion inside the image forming apparatus to form a toner image on the print medium. The image forming apparatus may pass the toner image through a fuser, thereby fusing the toner image on the print medium. A fuser may include a heat source, a heating roller, and a pressure roller arranged to be rotationally driven by being in pressure contact with the heating roller.

The fuser needs to maintain a proper temperature and pressure to maintain a toner's fusing level (fixing level) above a certain level. In a case where a temperature of a fusing nip formed by a heating roller and a pressure roller is too low, cold offset may occur. When cold offset occurs, a toner layer fails to reach a temperature range of glass transition may occur, and an unfixed toner may contaminate a component around the unfixed toner and damage a printing image and component of an image forming apparatus. In a case where a temperature of a fusing nip is too high, heterogeneity of the fuser between a roller and a toner may decrease, and hot offset where the toner clings to the roller may occur.

Therefore, a method of controlling the amount of heat generated by the fuser to maintain the fusing level of a toner above a certain level has been developed.

BRIEF DESCRIPTION OF THE DRAWINGS

The present disclosure may be easily understood by the combination of the following detailed descriptions and accompanying drawings, in which reference numerals refer to structural elements.

DETAILED DESCRIPTION

Figure 1:
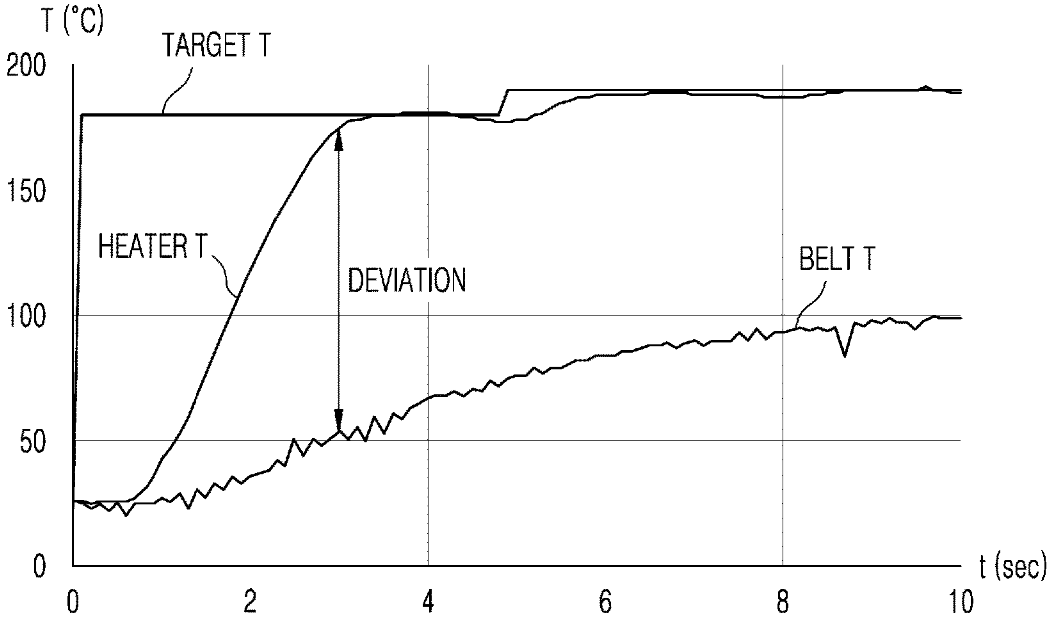
FIG. 1 is a graph to illustrate deviation of temperatures of a heating member and a fusing belt according to an example.

An "image forming device" may be any kind of device capable of performing an image forming operation, such as a printer, a scanner, a fax machine, a multi-function printer (MFP) or a display device, etc. The image forming device may also be a two dimensional (2D) image forming device or a 3D image forming device. An "image forming operation performed by the image forming device" may be an operation related to printing, copying, scanning, faxing, storage, transmission, coating, etc., or a combination of two or more of the operations described above.

The image forming device may include a developing device, an optical scanning device (light scanning device), a transfer device, and a fuser. A developing device may include a photoconductor on which an electrostatic latent image is formed and a developing roller for supplying a developer to the electrostatic latent image to develop the electrostatic latent image into a visible toner image. A photosensitive drum may be, for example, an organic photoconductor (OPC). A charging roller is an example of a charger that charges the photoconductor to have a uniform surface electric potential. A developer accommodated in a developer cartridge may be supplied to the developing device. The developer accommodated in the developer cartridge may be toner.

An optical scanning device is a device that forms an electrostatic latent image on the photoconductor by scanning light modulated corresponding to image information onto the photoconductor. A typical example of an optical scanning device is a laser scanning unit (LSU). Optical scanning units scan four light beams corresponding to image information of black (K), cyan (C), magenta (M), and yellow (Y) to the photosensitive drums of the develop devices to form electrostatic latent images. An electrostatic latent image of each photoconductor of the plurality of developing device may be developed into a visible toner image by developer supplied from a plurality of developer cartridge to a plurality of developing device.

The transfer device may transfer the toner image formed on the photoconductor to a printing medium. When the print medium passes through a fuser, a toner image is fixed to the print medium by heat and/or pressure. Depending on the type of the fuser, the shape of a heating member for applying heat and the shape of a pressure member for applying pressure may be different from each other. The heating member or the pressure member may have a roller type or a belt type depending on the type of the fuser. For example, the fuser may have a 2-Roll type including a heating roller, a pressure roller, and a heater, a 3-Roll type including one more pressure roller in addition to the 2-Roll type, a belt heating type in which the heating roller of the 2-Roll type is replaced with a belt to improve heating performance, an induction heating (IH) type generating heat with induced current, etc. The belt heating type may be a free belt nip fuser (FBNF) type using a pressure belt with a built-in pressure portion, an instantaneous fusing system (IFS) type using a heating belt with a pressure portion, an on-demand fusing (ODF) type in which a heating area of a belt is concentrated in a fusing nip.

The heating member may include a single heat generator or a plurality of heat generator. The heat generator may be referred to as a heat source. The heat generator may be a heating lamp or a ceramic heater. The fused (fixed) print medium may be discharged by a discharge roller.

The fuser needs to maintain a proper temperature and pressure to maintain a toner's fusing level (fixing level) above a certain level. The amount of generated heat of a heat source of a fuser may be controlled to maintain an appropriate temperature in a fusing nip.

The amount of heat that transfers from the heat source to the toner may be maintained uniformly by controlling the amount of generated heat of the heat source of the fuser. The amount of heat that transfers to the toner may be affected by a temperature difference between a heating roller and a toner layer. Heat transfers from the heat source to the toner through a heating roller or a heating belt. A mechanism for transferring heat from the heat source to the heating roller or belt varies according to the structural characteristics of the fuser, thus, the amount of generated heat may be controlled in consideration of the structural characteristics of the fuser.

FIG. 1 is a graph to illustrate deviation of temperatures of a heating member and a fusing belt, according to an example.

In an ODF type fuser, a heating member, that is, a heater, is located in a form of a plate on an area where a fusing nip is formed, and a belt of the fusing nip area may be heated intensively. In the ODF type fuser, unlike other type of fusers, may transfer heat from the heat source to the belt by a conduction mechanism. The conduction of heat is affected by thermal conductivity of a medium and contact thermal resistance between different media, which makes it difficult to control the heat in the ODF type fuser.

A temperature of a heater may be sensed and the amount of generated heat of the heater may be controlled in order to effectively control the generated heat of the ODF type fuser. The temperature of the heat is increased by the electric power supplied from a power supply, and the heat is supplied from the heater to the belt to increase the temperature of the belt. In the ODF type fuser, heat is not directly transferred from the belt to the toner, but the heat is supplied to the toner after the temperature of the belt rises.

Referring to FIG. 1, temperature deviation between the heater and the belt of the fuser gradually increases at the initial stage of driving the fuser, and the temperature deviation decreases while the temperature of the heater is maintained at a target temperature level. The printing quality may be lowered in a case where a printing medium to which toner is transferred is supplied to a fuser in a period with great temperature deviation.

Figure 2:
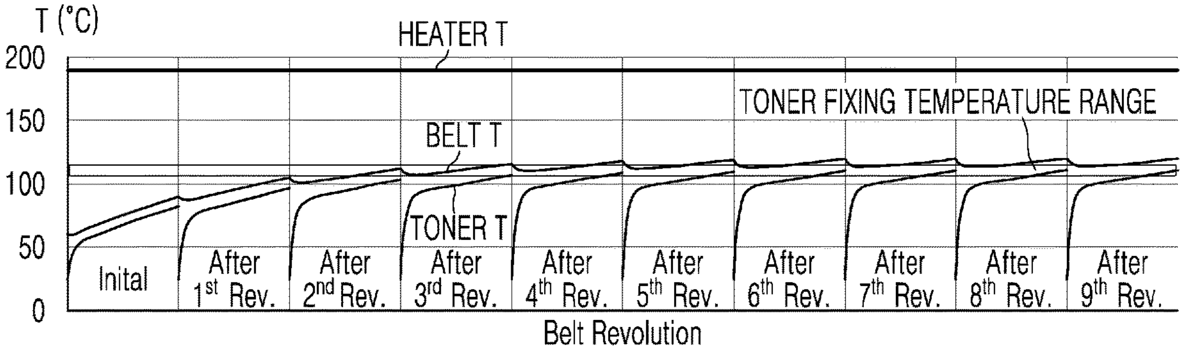
FIG. 2 is a graph to illustrate a temperature of a belt being increasing and converging in a fusing nip while a printing medium, to which a toner is transferred, passing through a fusing nip, according to an example.

FIG. 2 is a graph to illustrate a temperature of a belt being increasing and converging in a fusing nip while a printing medium, to which a toner is transferred, passing through a fusing nip, according to an example.

Figure 3:
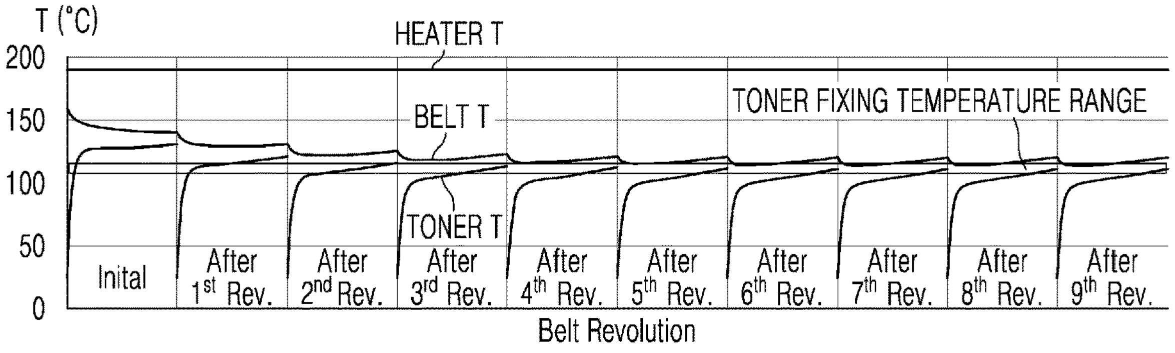
FIG. 3 is a graph to illustrate a temperature of a belt being decreasing and converging in a fusing nip while a printing medium, to which a toner is transferred, passing through a fusing nip, according to an example.

FIG. 3 is a graph to illustrate a temperature of a belt being decreasing and converging in a fusing nip while a printing medium, to which a toner is transferred, passing through a fusing nip, according to an example.

As described above, the printing quality may be lowered in a case where a printing medium to which toner is transferred is supplied to a fuser in a period with great temperature deviation. The printing medium may be supplied to the fuser in response to the temperature of the heater reaching a critical temperature so that printing is performed in a period with relatively small temperature deviation.

However, referring to FIG. 2, even while the temperature of the heater is uniformly maintained at the target temperature, a temperature of the belt may not be uniformly maintained unlike the temperature of the heater If the belt was at a relatively low temperature, it may take more time for the belt to rise to a suitable temperature. If a printing medium is transferred to a fuser to proceed printing in a state where the temperature of the belt does not reach a suitable temperature, fusing failure such as the cold offset may occur. In consideration of the time it takes for the temperature of the belt to rise to a suitable temperature, even while the temperature of the heater reaching the target temperature, transfer of a printing medium may be further delayed while maintaining the temperature of the heater.

As shown in FIG. 3, if the belt was at a relatively high temperature which is lower than the temperature of the heater but not suitable for fusing, it would take more time for the belt to decrease to the suitable temperature. If a printing medium is transferred to a fuser to proceed printing without considering the additional time needed for the temperature of the belt to reach the suitable temperature, a temperature of a toner layer may exceed a fusing temperature range and fusing failure such as the hot offset may occur.

The temperature deviation between the heater and the belt shown in the ODF type fuser may be affected by a mechanical characteristic of the heater and the belt. For example, the temperature deviation between the heater and the belt may increase as heat capacity of the heater decreases. This is because the heat capacity of the heater that generates heat decreases, so that an increase rate of the temperature of the heater becomes faster. Likewise, the temperature deviation between the heater and the belt may decrease as heat capacity of the heater increases.

The temperature deviation between the heater and the belt shown in the ODF type fuser may be affected by thermal resistance and thermal conductivity between the heater and the belt, a width of the fusing nip, pressure force, roughness of contact surfaces as well as the heat capacity of the heater. For example, heat that transfers from the heater to the belt may decrease as the thermal resistance increases so that the temperature deviation between the heater and the belt increases.

Even though specification of the heater and the belt is fixed, the temperature deviation between the heater and the belt shown in the ODF type fuser is affected by an environmental factor such as a temperature at an initial driving stage of the fuser as illustrated in FIGS. 2 and 3 as well as mechanical characteristics of the heater and the belt. Due to the mechanical characteristics of the ODF type fuser and environmental factors, if the fuser is driven or the amount of heat is controlled only by the temperature of the heater, it is difficult to achieve a high level of printing quality, the printing quality at the initial stage of printing is poor, or the first print out time is delayed.

Hereinafter, the present disclosure will be described in detail with reference to the accompanying drawings, in which examples of the present disclosure are shown such that those skilled in the art may easily work the present disclosure. However, the present disclosure may be implemented in various different forms and is not limited to the examples described herein.

Terms including ordinals such as first, second, etc. may be used to identify various components, but the components are not limited by the terms. These terms are used for the purpose of distinguishing one component from another. For example, a first component may be referred to as a second component, a second component may be referred to as a first component, and their ordinal number may be omitted.

Figure 4:
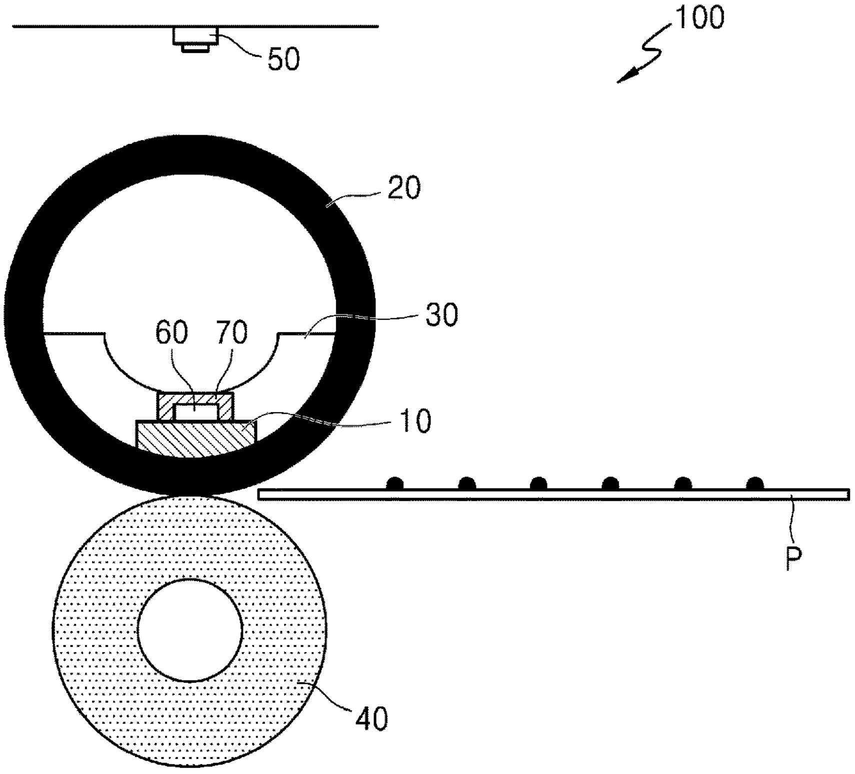
FIG. 4 is a cross-sectional view of an example fuser.
Figure 5:
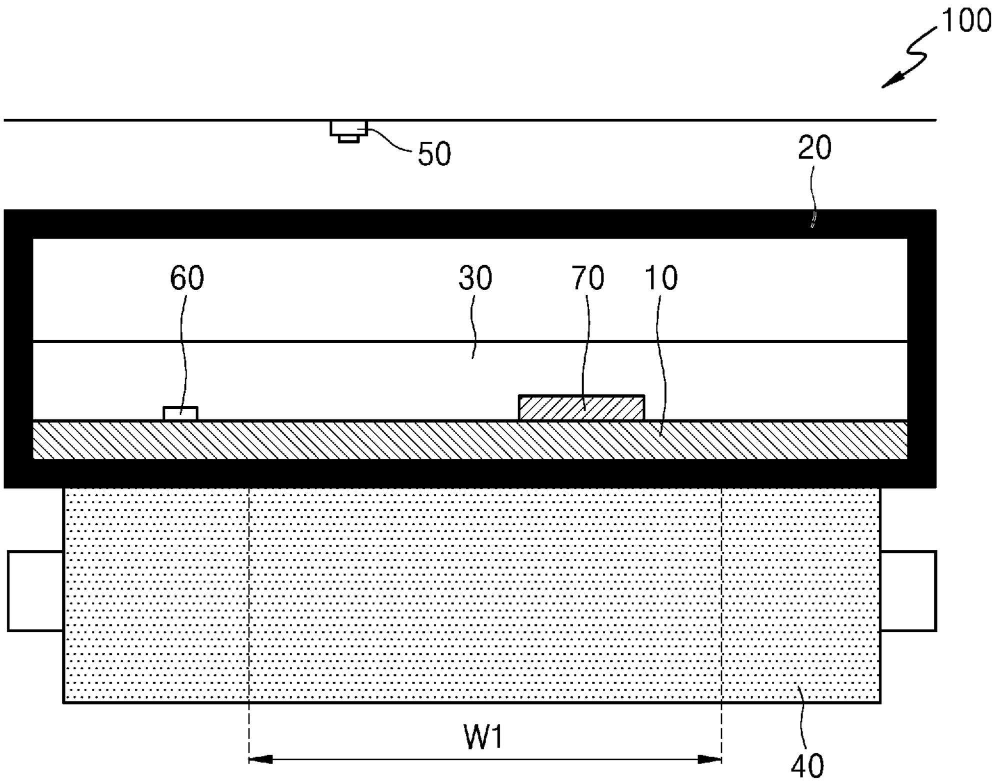
FIG. 5 is a front view of an example fuser.

FIG. 4 is a cross-sectional view of an example fuser, and FIG. 5 is a front view of an example fuser.

The fuser 100 may be an ODF type fuser 100 but is not limited thereto, may be another type of a fuser 100.

Referring to FIGS. 4 and 5, the fuser 100 may include a heating member 10, a fusing belt 20, a pressure member 30, a pressure roller 40, and a first temperature sensor 50 and a second temperature sensor 60, but is not limited thereto. For example, the fuser 100 may include a processor. The processor may be a thermostat 70 to control heat of the heating member 10, but is not limited thereto. The fuser 100 may include a plurality of processors. The thermostat 70 may function as a fuse to cut off power supply to the heating member 10 in a case where a temperature of the heating member 10 increases excessively.

The heating member 10 may include a single heat generator, but is not limited thereto. The heating member 10 may include a plurality of heat generators, which will be explained later by referring to FIGS. 15 and 16. The heating member 10 may be referred to as a heater. The heat generator may be referred to as a heat source. The heat generator may be a heating lamp or a ceramic heater.

The fusing belt 20 may be heated by its inner circumferential surface being in contact with the heating member 10. The fusing belt 20 may be an endless belt, but is not limited thereto.

The heating member 10 and the fusing belt 20 are located between the pressure member 30 and the pressure roller 40, and a pressure is applied to the heating member 10 and the fusing belt 20 by the pressure member 30 and the pressure roller 40 to form a fusing nip.

The first temperature sensor 50 may sense a temperature of a belt. The first temperature sensor 50 may be a non-contact temperature sensor 50 positioned outside the fusing belt 20 to sense the temperature of the outer circumferential surface of the fusing belt 20, but is not limited thereto. For example, a first temperature sensor may be a contact temperature sensor 52 being in contact with an outer circumferential surface of the fusing belt 20 as illustrated in FIGS. 6 and 7.

Figure 6:
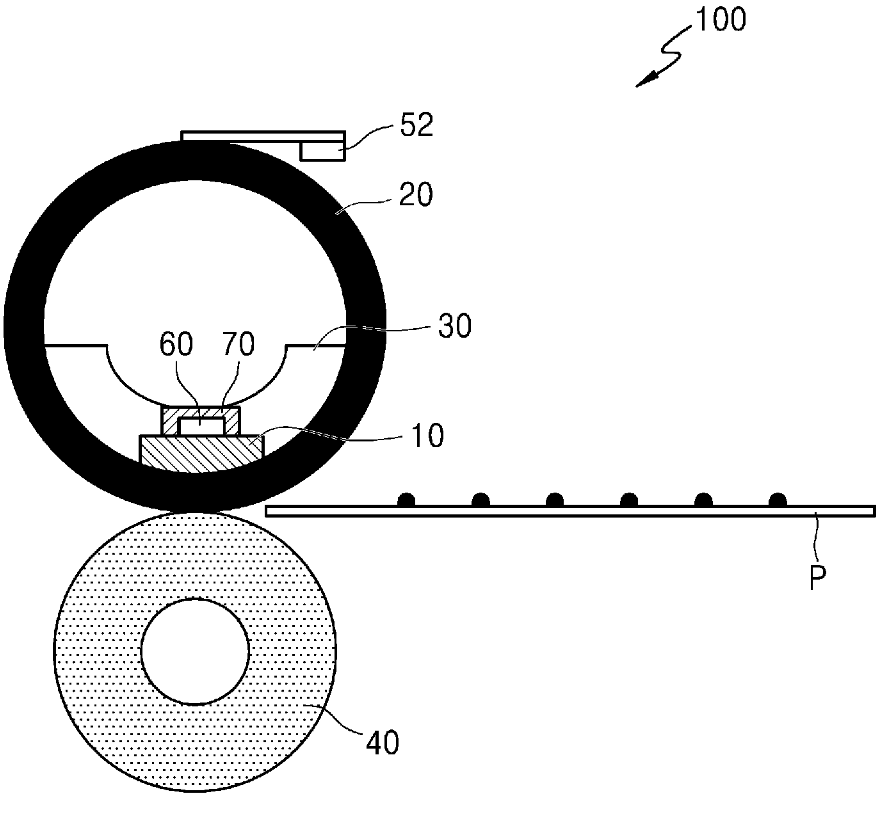
FIG. 6 is a cross-sectional view of an example fuser.
Figure 7:
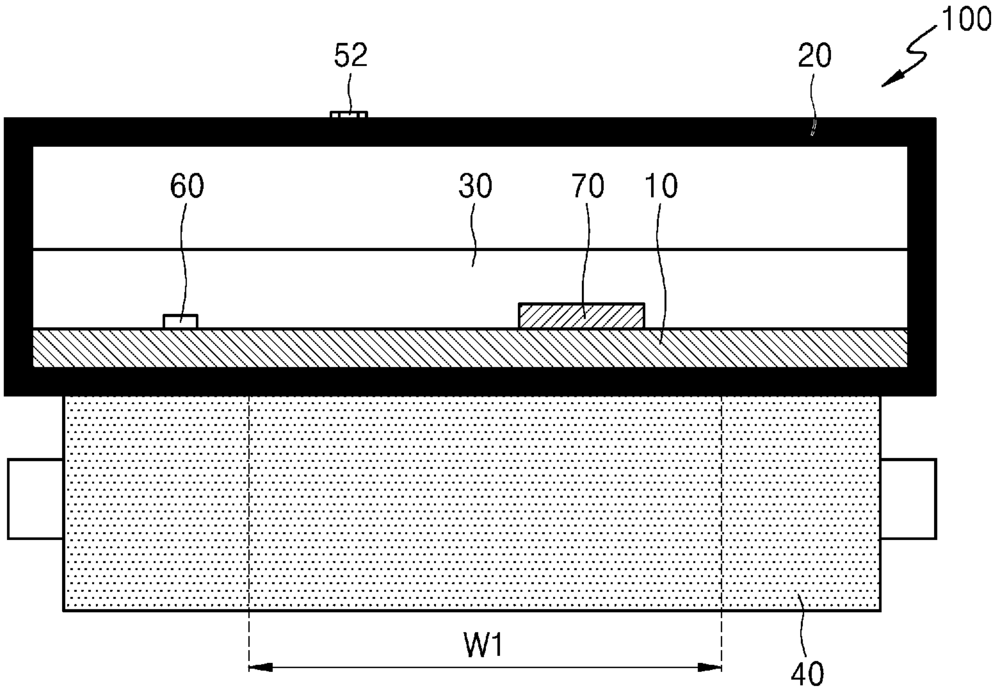
FIG. 7 is a front view of an example fuser.

FIGS. 6 and 7 are a cross-sectional view and a front view of an example fuser, respectively. A contact temperature sensor 52 of FIGS. 6 and 7 performs substantially the same function as the non-contact temperature sensor 50 of FIGS. 4 and 5, and redundant explanation will be omitted. The first temperature sensors 50 and 52 may be positioned to be spaced apart from the outer circumferential surface of the fusing belt 20 by a predetermined distance.

If the belt 20 is in contact with the temperature sensor 52, its contact area may affect printing image quality such as glossiness of a printed image. Therefore, the non-contact temperature sensor 50 may be used in a color printer and color multi-function printer, and the contact temperature sensor 52 may be used in a monochrome printer and monochrome multi-function printer to reduce the cost.

The fuser 100 may effectively control the amount of heat generated by the heating member 10 and a transfer of a printing medium by sensing the temperature of the belt 20 with the first temperature sensor 50. A method of controlling the amount of heat generated by the heating member 10 and a transfer of a printing medium will be explained later by referring to FIG. 8.

The fusing belt 20 may consist of a plurality of layers such as a base layer, an elastic layer, and a release layer, and each layer may be connected to each other with a primer. Temperatures of an inner surface and an outer surface of the fusing belt 20 may be different because contact thermal resistance is generated for each layer. Sensing, by the first temperature sensor 50, the temperature of the outer circumferential surface of the fusing belt 20 being directly in contact with a printing medium (that is, a toner layer) may be more effective to control the amount of heat generated by the heating member 10 and whether to transfer a printing medium than sensing a temperature of an inner circumferential surface of the fusing belt 20.

The second temperature sensor 60 may sense a temperature of the heating member 10. The second temperature sensor 60 may be in contact with the heating member 10. The second temperature sensor 60 may be located in a space formed by the inner circumferential surface of the fusing belt 20.

The fuser 100 includes the second temperature sensor 60 as well as the first temperature sensor 50, and its manufacturing cost also increases, but loss due the increased manufacturing cost may be minimized by adjusting locations of the temperature sensors 50 and 60. For example, the first temperature sensor 50 may be located in a first area on a first axis of the fuser 100. The first axis may be parallel to a horizontal axis of the fuser 100, and the first area may correspond to a minimum paper width W1 of the fuser 100. That is, the first temperature sensor 50 maybe located within the minimum paper width W1. The second temperature sensor 60 senses the temperature of the heating member 10 to prevent overheating of the heating member 10, so a location of the heating member 10 on the horizontal axis may be not limited. The second temperature sensor 60 may be located in a second area on a second axis of the fuser 100. The second axis may be parallel to a horizontal axis of the fuser 100, and the second area may be located diagonally to the first area. In a case where the first area corresponds to the minimum paper width W1 of the fuser 100, that is, the first temperature sensor 50 is located within the minimum paper width W1, the second temperature sensor 60 may be located outside of the minimum paper width W1. Locating the second temperature sensor 60 that senses the temperature of the heating member 10 on an end portion outside the minimum paper width W1 may be helpful to prevent the problem of overheating of the end portion during printing a paper with a narrow width.

The heat generated by the heating member 10 of the fuser 100 and a transfer of a printing medium may be more effectively controlled by sensing the temperature of the heating member 10 through the second temperature sensor 60, which will be explained later by referring to FIGS. 11 and 12.

Figure 8:
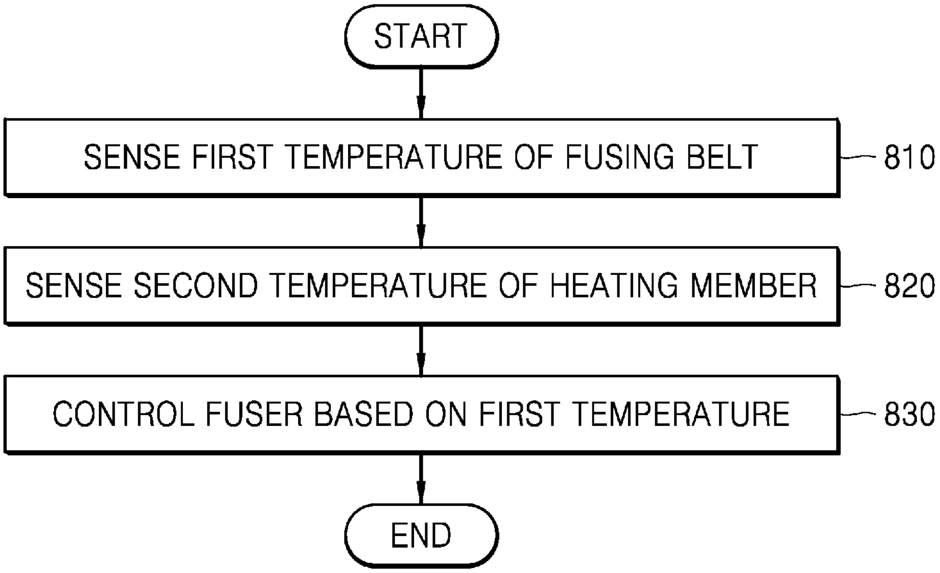
FIG. 8 is a flowchart of an example to illustrate a process of controlling a fuser based on a temperature of a fusing belt.

FIG. 8 is a flowchart of an example to illustrate a process of controlling a fuser based on a temperature of a fusing belt.

In operation 810, a first temperature of a fusing belt of a fuser is sensed. The first temperature of an outer circumferential surface of the fusing belt may be sensed through the temperature sensor of the fuser located outside of the fusing belt.

In operation 820, a second temperature of a heating member of the fusing belt is sensed. Operations 810 and 820 may be performed substantially simultaneously, but are not limited thereto.

In operation 830, the fuser may be controlled based on the first temperature of the fusing belt. For example, heat generated by the heating member may be controlled based on the first temperature of the fusing belt. For example, power supply to the heating member is cut off or the heat generated by the heating member may be controlled in response to the first temperature of the fusing belt reaching a certain temperature or being within a certain temperature range. Accordingly, the fusing belt may be maintained at a temperature suitable for fusing, so the printing quality and performance may be improved.

The heat generated by the heating member and a transfer timing of a printing medium is determined based on the temperature of the fusing belt, so the occurrence of the cold offset and hot offset problems described with reference to FIGS. 2 and 3 is reduced to guarantee stable printing quality.

Since a temperature of a fusing belt may vary at a fusing nip in the ODF type fuser, a temperature does not change at other parts other than the fusing nip in a case where the fusing belt is not rotated and slipped. Based on such principal, whether or not the belt slips may be quickly determined from a temperature change characteristic of the fusing belt, thereby preventing damage to the fusing belt.

In a case where a wrap jam occurs in the ODF type fuser, the first temperature sensor to sense the temperature of the outer circumferential surface of the fusing belt senses a temperature of a paper jammed between the fusing belt and the first temperature sensor to sense dramatic decrease of the temperature. Whether the wrap jam occurs may be determined from the temperature change characteristic of the fusing belt, so that the malfunction of a system may be stopped earlier, thereby, reducing damage to the system.

For example, it may be determined that belt slip or wrap jam problem have occurred in a case where a change rate of temperature detected by the first temperature sensor decreases by a predetermined degree or more, or difference between temperatures of the fusing belt and the heating member increases by a predetermined degree or more, or difference between change rates of the fusing belt and the heating member increases by a predetermined degree or more.

Figure 9:
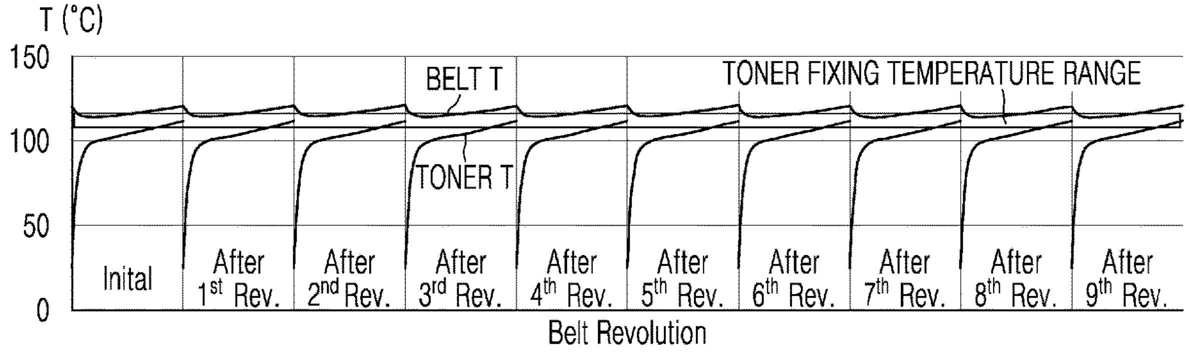
FIG. 9 is a graph to illustrate temperature changes of a belt and a toner layer in a fusing nip while a heat generated by a heating member is controlled based on a belt temperature in a fusing nip of an example fuser.

FIG. 9 is a graph to illustrate temperature changes of a belt and a toner layer in a fusing nip while a heat generated by a heating member is controlled based on a belt temperature in a fusing nip of an example fuser.

Referring to FIG. 9, the amount of heat generated by the heating member is controlled based on the temperature of the fusing belt sensed by the first temperature sensor, the temperature of the belt at the fusing nip may be effectively maintained at a stable range (that is, within a toner fusing temperature range).

Figure 10:
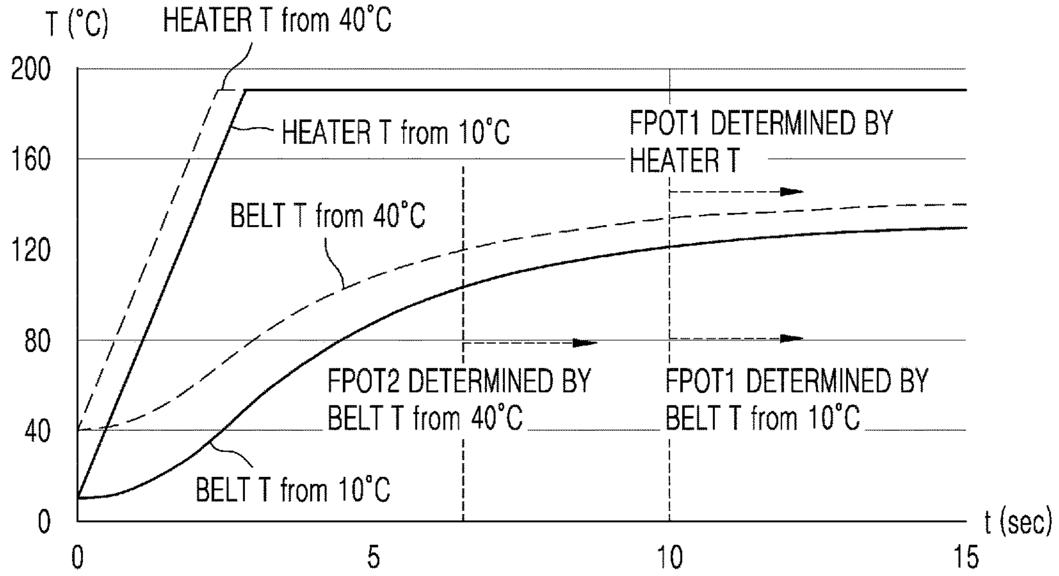
FIG. 10 is a graph to illustrate reduction of printing time of an example fuser.

FIG. 10 is a graph to illustrate reduction of printing time of an example fuser.

In a case where a temperature of the fusing belt is not sensed, that is, only the temperature of the heating member is sensed to determine whether to transfer a printing medium, as described with reference to FIG. 2, even if the temperature of the heating member reaches a target temperature, printing may be delayed to prepare for a case where the temperature of the fusing belt is not increased to a suitable temperature. The initiation of printing may be delayed to guarantee stability of printing even though the temperature of the fusing belt has been increased to a suitable temperature. That is, printing may be started after a certain amount of time elapses after the temperature of the fusing belt reaches the suitable temperature. However, by sensing the temperature of the fusing belt, in a case where the temperature of the fusing belt is relatively higher than usual (for example, 40° C.), the printing may be started earlier than usual in response to detecting that the temperature of the fusing belt reaches a temperature suitable for fusing, for example, 120° C. Accordingly, in a case where the temperature of the fusing belt reaches a temperature at which a toner can be fused properly. printing may be started immediately without delaying the start of printing, so a first print out time, FPOT, may be shortened. Furthermore, it may be prevented that fusing proceeds at a temperature at which a toner cannot be fused properly.

Figure 11:
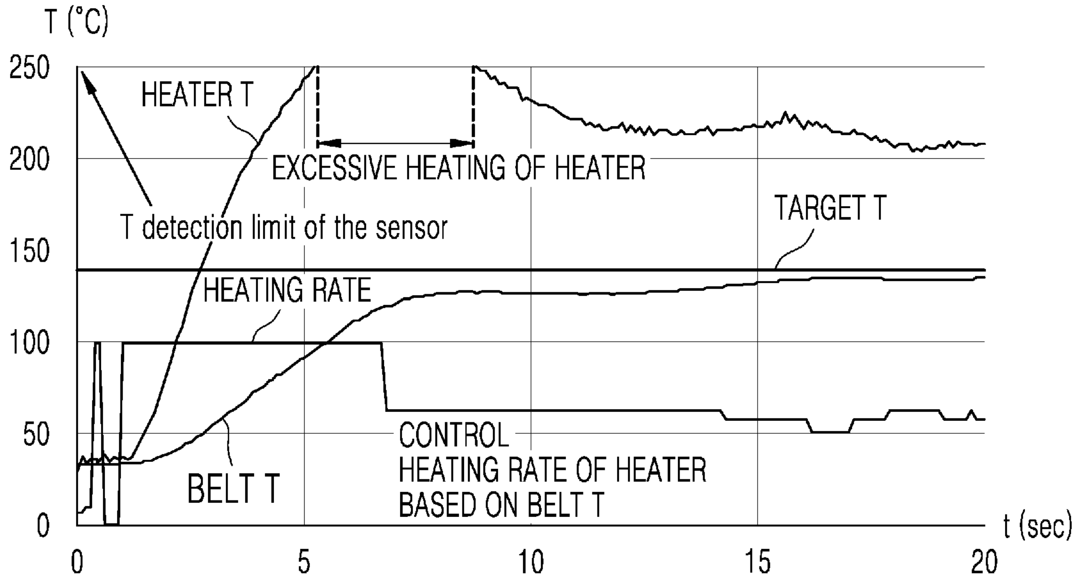
FIG. 11 is a graph to illustrate changes of generated heat of a heating member during printing, according to an example.

FIG. 11 is a graph to illustrate that a temperature changes while the amount of generated heat of a heating member is controlled based on a belt temperature in an example fuser.

Figure 12:
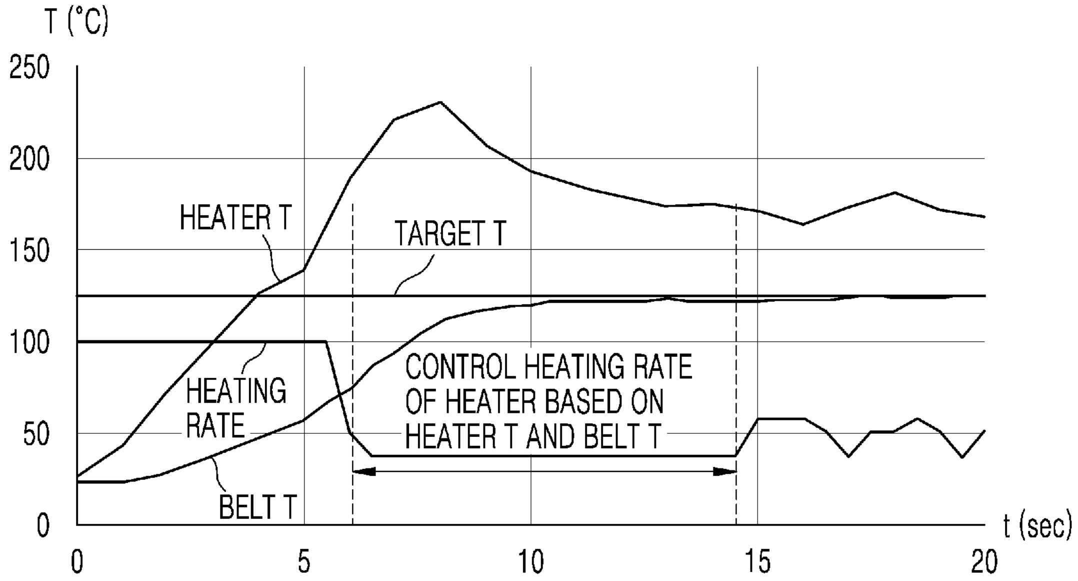
FIG. 12 is a graph to illustrate changes of generated heat of a heating member during printing, according to an example.

FIG. 12 is a graph to illustrate that a temperature changes while the amount of generated heat of a heating member is controlled based on a belt temperature and a temperature of the heating member in an example fuser.

The heating member may be overheated if the heat generated by the heating member is controlled only by the temperature of the fusing belt. Referring to FIG. 1, the heating member may be overheated due to difference between temperature rises of the heating member and the fusing belt if the heat generated by the heating member is controlled only by the temperature of the fusing belt. Overheating of the heating member may damage the heating member itself as well as other members adjacent to the heating member. Therefore, the fuser may stop heating the heating member by sensing the temperature of the heating member through the second temperature sensor of the fuser in a case where the temperature of the heating member exceeds a threshold temperature of a threshold range. The heating member stays at a relatively high temperature, so the temperature of the fusing belt may further increase due to the heat transferred from the heating member to the fusing belt.

If power supply to the heating member is turned on and off, flicker of the power supply may be triggered. Therefore, it may be implemented to control the heating member with a lowered heating rate than a previous heating rate in a case where the temperature of the heating member exceeds a level lower than the threshold temperature of the threshold range. Thereby, in the initial temperature rising process of the fuser, not only the excessive temperature rise of the heating member (for example, the maximum of the detected temperature in FIG. 11) is avoided, but also the amount of heat generated may be continuously controlled.

FIG. 12 illustrate that the excessive temperature rise of the heating member is prevented based on the temperature of the heating member sensed by the second sensor, but the second temperature sensor may further play another role. For example, the fuser may control the amount of heat generated by the heating member so that the temperature of the heating member detected by the second temperature sensor reaches a target temperature or target temperature range, and it may be determined based on the temperature of the fusing belt sensed by the first sensor to transfer a printing medium the fusing nip. The fuser may turn off the heating member or lower a heating rate in case where the temperature of the fusing belt is greater than a temperature suitable for fusing. In order to determine the heating rate of the heating member based on the temperature of the heating member sensed by the second temperature sensor, the first sensor may be located outside the minimum paper width of the fuser and the second temperature sensor may be located within the minimum paper width of the fuser unlike the examples of FIGS. 4 and 5 where the first temperature sensor is located within the minimum paper width of the fuser. The first temperature sensor located outside the minimum paper width may be used to detect overheating of an end portion of the fuser. Unlike examples of FIGS. 4 and 5, even though the first temperature sensor is located outside the minimum paper width of the fuser and the second temperature sensor is located within the minimum paper width, it may be determined that belt slip or wrap jam problem have occurred in a case where a change rate of temperature detected by the first temperature sensor decreases by a predetermined degree or more, or difference between temperatures of the fusing belt and the heating member increases by a predetermined degree or more, or difference between change rates of the fusing belt and the heating member increases by a predetermined degree or more.

Figure 13:
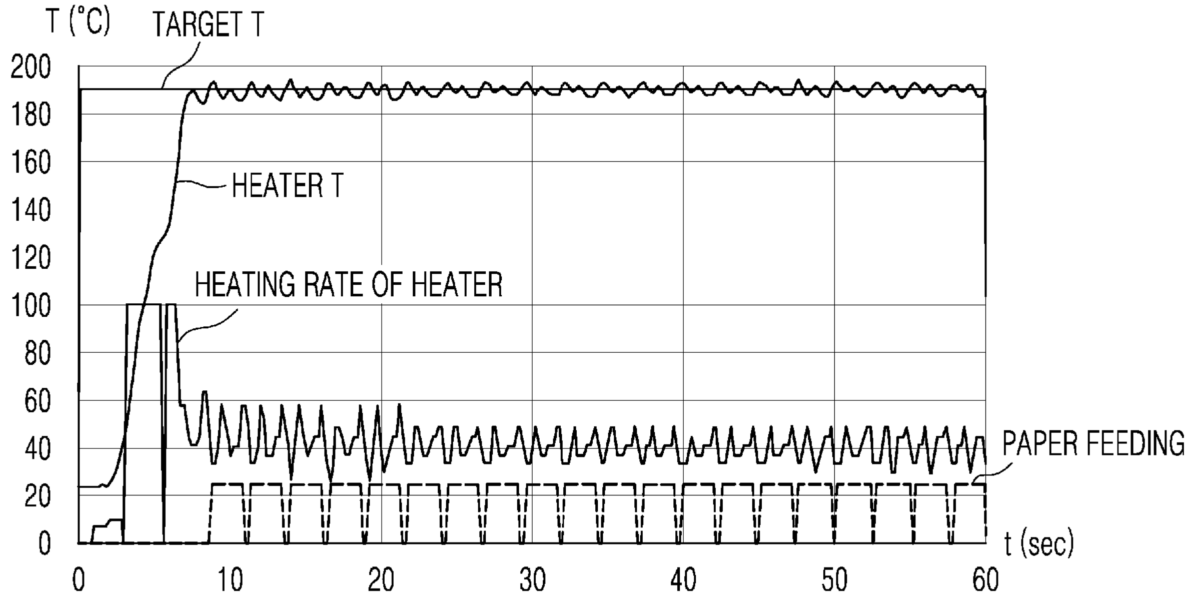
FIG. 13 is a graph to illustrate that a temperature changes while the amount of generated heat of a heating member is controlled based on a belt temperature in an example fuser.
Figure 14:
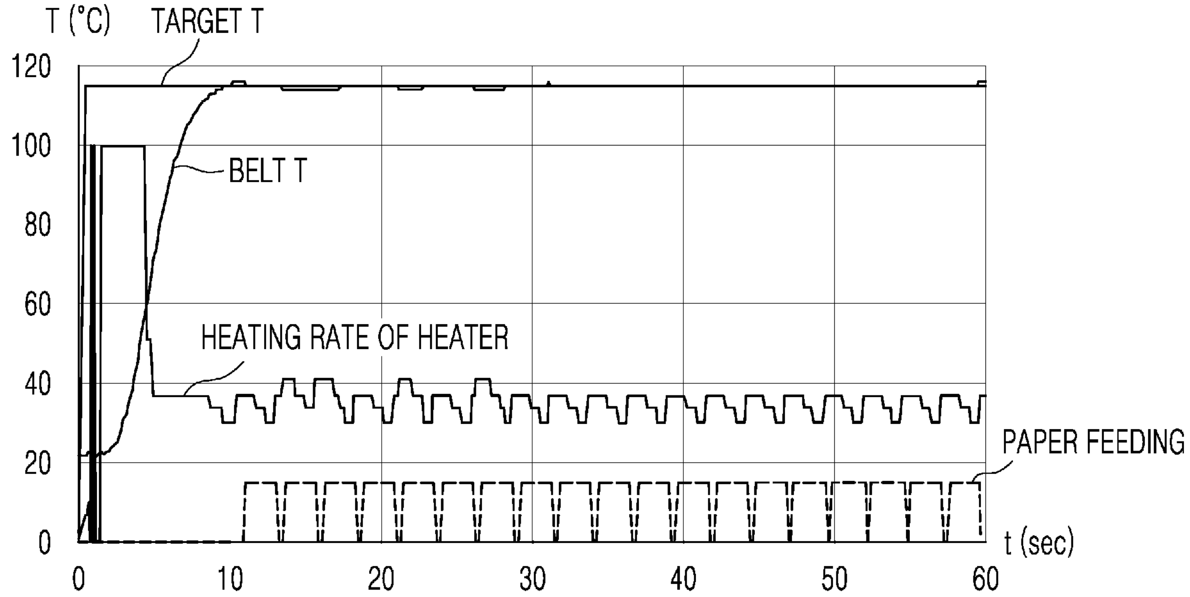
FIG. 14 is a graph to illustrate that a temperature changes while the amount of generated heat of a heating member is controlled based on a belt temperature and a temperature of the heating member in an example fuser.

FIG. 13 is a graph to illustrate changes of generated heat of a heating member during printing, according to an example. FIG. 14 is a graph to illustrate changes of generated heat of a heating member during printing, according to an example.

FIG. 13 illustrates that the amount of the generated heat is controlled based on the temperature of the heating member, and FIG. 14 illustrates that the amount of the generated heat is controlled based on the temperature of the fusing belt.

Since a temperature change of the heating member is greater than a temperature change of the fusing belt, a fluctuation range of the amount of the generated heat controlled based on the temperature of the heating member is greater than a fluctuation range of the amount of the generated heat controlled based on the temperature of the fusing belt. A time constant of the temperature sensor may also affect the fluctuation range of the amount of the generated heat of the heating member.

As the fluctuation of the amount of the generated heat of the heating member decreases, fluctuation of power supply also decreases, thereby, improving the quality related to the power supply such as flicker and harmonics. That is, in order to realize stable printing, the fluctuation of power supply decreases during supplying a paper by controlling the generated heat based on the temperature of the fusing belt.

Figure 15:
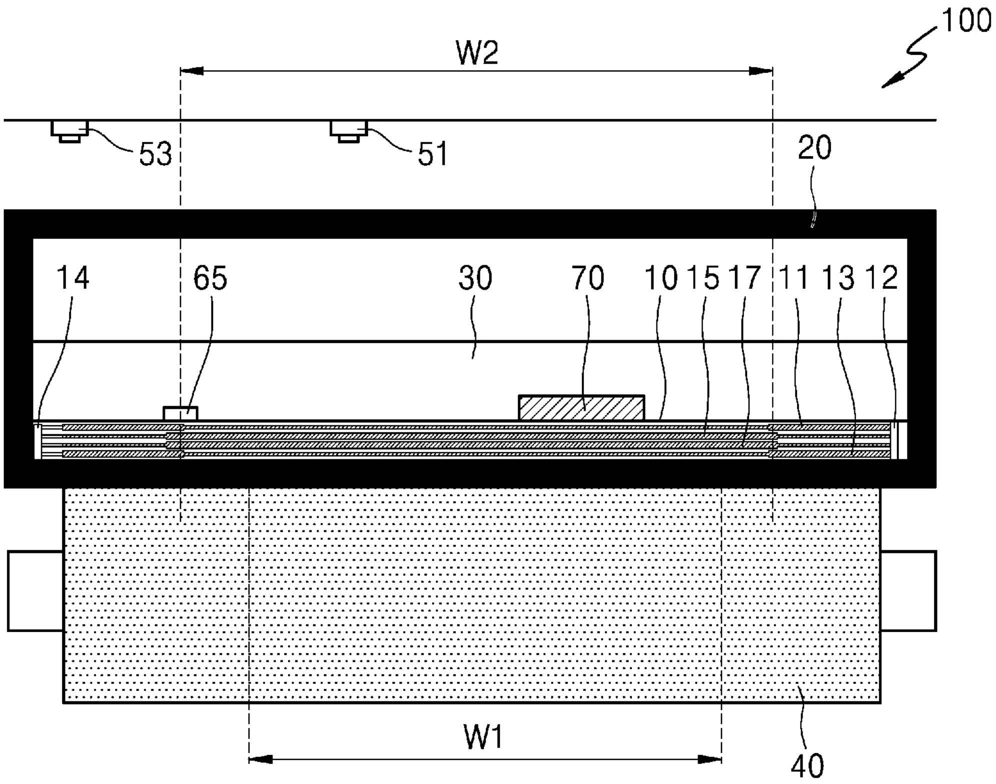
FIG. 15 is a front view of an example fuser.

FIG. 15 is a front view of an example fuser.

Referring to FIG. 15, a fuser 100 may include two first temperature sensors 51 and 53 to sense a temperature of an outer circumferential surface of a fusing belt 20, and a second temperature sensor 65 to sense a temperature of a heating member 10, but is not limited thereto. For example, the fuser 100 may include two or more first temperature sensors and one or more second sensors.

The temperature sensors 51, 53 and 65 of the fuser 100 may sense temperatures of different areas on a horizontal direction of the fuser 100. For example, the temperature sensors 51, 53 and 65 of the fuser 100 may be located in a zigzag manner as shown in FIG. 15 to sense temperatures of the outer circumferential surface of the fusing belt 20 and the heating member 10.

Referring to FIG. 15, the heating member 10 of the fuser 100 may include a plurality of heat generators 11, 13, 15, and 17 and their driving electrodes 12 and 14. The heat generators 11, 13, 15 and 17 may include heating areas. The heating member 10 may include a main heating area W2.

The first temperature sensors 51 and 53 to sense the temperature of the outer circumferential surface of the fusing belt 20 may be located in areas corresponding to the heating areas of the heat generators 11, 13, 15 and 17. The second temperature sensor 65 to sense the temperature of the heating member 10 may be located in one of overlap heating areas between the heating areas of the heat generators 11, 13, 15 and 17.

A first temperature sensor 51 may be located within a minimum paper width W1, and the minimum paper width W1 may be included within a heating area of the heat generators 15 and 17 corresponding to the first temperature sensor 51. The minimum paper width W1 may be included within the main heating area W2 of the heating member 10. Another first temperature sensor 53 may be located outside the minimum paper width W1. The other first temperature sensor 53 may be located outside the main heating area W2 of the heating member 10.

Overheating of each heat generator 11, 13, 15 or 17 may be controlled by the plurality of temperature sensors 51, 53 and 65, the accuracy of heat control and a paper transfer timing may be improved, and a belt slip and wrap jam may be accurately detected. A method of determining the overheating and the paper transfer timing is explained above by referring to FIGS. 4 and 5, and redundant description will be omitted. A method of detecting the belt slip and wrap jam is explained above by referring to FIG. 8, and redundant description will be omitted.

Figure 16:
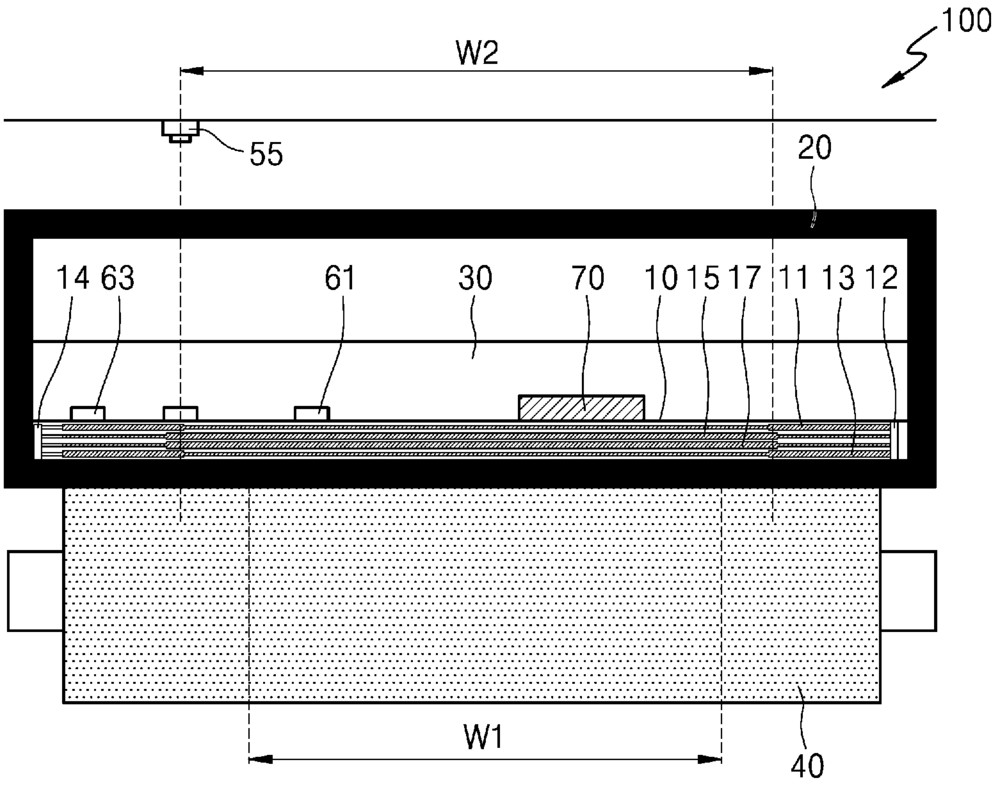
FIG. 16 is a front view of an example fuser.

FIG. 16 is a front view of an example fuser.

Referring to FIG. 16, the fuser 100 may include one first temperature sensor 55 to sense a temperature of an outer circumferential surface of a fusing belt 20, and two second temperature sensors 61, 63 to sense a temperature of a heating member 10, but is not limited thereto. For example, the fuser 100 may include one or more first temperature sensors and two or more second sensors.

The temperature sensors 61, 63 and 55 of the fuser 100 may sense temperatures of different areas on a horizontal direction of the fuser 100. For example, the temperature sensors 61, 63 and 55 of the fuser 100 may be located in a zigzag manner as shown in FIG. 16 to sense temperatures of the outer circumferential surface of the fusing belt 20 or the heating member 10.

Referring to FIG. 16, the heating member 10 of the fuser 100 may include a plurality of heat generators 11, 13, 15, and 17 and their driving electrodes 12 and 14. The heat generators 11, 13, 15 and 17 may include heating areas. The heating member 10 may include a main heating area W2.

The second temperature sensors 61 and 63 to sense the temperature of the heating member 10 may be located in areas corresponding to the heating areas of the heat generators 11, 13, 15 and 17. The first temperature detecting sensor 55 to sense the temperature of the outer circumferential surface of the fusing belt 20 may be located in one of overlap heating areas between the heating areas of the heat generators 11, 13, 15 and 17.

A second temperature sensor 61 may be located within a minimum paper width W1, and the minimum paper width W1 may be included within a heating area of the heat generators 15 and 17 corresponding to the second temperature sensor 61. The minimum paper width W1 may be included within the main heating area W2 of the heating member 10. Another second temperature sensor 55 may be located outside the minimum paper width W1. The other second temperature sensor 55 may be located outside the main heating area W2 of the heating member 10.

Overheating of each heat generator 11, 13, 15 or 17 may be controlled by the plurality of temperature sensors 61, 63 and 55, the accuracy of heat control and a paper transfer timing may be improved, and a belt slip and wrap jam may be accurately detected. A method of determining the overheating and the paper transfer timing is explained above by referring to FIG. 12, and redundant description will be omitted. A method of detecting the belt slip and wrap jam is explained above by referring to FIG. 8, and redundant description will be omitted.

While various examples are explained with reference to accompanying drawings, those who skilled in the art may modify and change the examples from the disclosure. For example, the techniques described may be performed in a different order than the described methods, and/or the described systems, structures, devices, circuits, or any components may be integrated or combined in a different form than the described methods, or may be replaced or substituted by other components or their equivalents, in order to achieve an appropriate result.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A fuser comprising:

a heating member comprising a plurality of heat generators;

a fusing belt including an inner circumferential surface, the fusing belt to be heated by the heating member by having the inner circumferential surface of the fusing belt in contact with the heating member;

a first temperature sensor to sense a first temperature of an outer circumferential surface of the fusing belt;

a second temperature sensor to sense a second temperature of the heating member;

a third temperature sensor to sense a third temperature of the outer circumferential surface of the fusing belt or the heating member;

wherein the plurality of heat generators include heating areas, and wherein the heating areas of adjacent heat generators overlap in a direction perpendicular to a horizontal direction of the fuser to form overlap heating areas, wherein the first, second, and third temperature sensors are arranged offset from each other in the horizontal direction of the fuser and respectively sense temperatures of different areas on a horizontal direction of the fuser, wherein the different areas correspond to the heating areas of the plurality of heat generators or an overlap heating area between the heating areas, wherein one of the first and second temperature sensors is located in an area corresponding to a heating area of the heat generators, and the other is located in one of the overlap heating areas between the heating areas of the heat generators.

2. The fuser of claim 1, wherein the first temperature sensor for sensing the outer circumferential surface of the fusing belt is apart from the outer circumferential surface of the fusing belt.

3. The fuser of claim 1, wherein the first temperature sensor is located in a first area corresponding to a heating area of the heat generators, the second temperature sensor is located in a second area diagonal to the first area.

4. The fuser of claim 3, wherein the first area or the second area corresponds to a minimum paper width of the fuser.

5. The fuser of claim 1, further comprising:

a processor to control the heat of the heating member based on the temperature of the fusing belt, which is obtained by the first temperature sensor.

6. The fuser of claim 1, further comprising:

a processor to determine whether to transfer a printing medium to the fuser based on the temperature of the fusing belt, which is obtained by the first temperature sensor.

7. The fuser of claim 1, further comprising:

a processor to control heating of the heating member and/or transfer of a printing medium to the fuser in response to determining that the temperature of the fusing belt, which is obtained by the first temperature sensor does not arrive at a predetermined value or to determining that a change rate of the temperature of the fusing belt does not reach a predetermined value.

8. The fuser of claim 1, further comprising:

a processor to control heating of the heating member and/or transfer of a printing medium to the fuser in response to determining that difference between the temperature of the fusing belt, which is obtained by the first temperature sensor, and the temperature of heating member, which is obtained by the second temperature sensor, exceeds a predetermined range.

9. The fuser of claim 1, further comprising:

a processor to control heating of the heating member and/or transfer of a printing medium to the fuser in response to determining that difference between a change rate of the temperature of the fusing belt, which is obtained by the first temperature sensor and a change rate of the temperature of heating member, which is obtained by the second temperature sensor exceeds a predetermined range.

10. A controlling method of a fuser, the controlling method comprising:

sensing, by a first temperature sensor, a first temperature of an outer circumferential surface of a fusing belt of the fuser;

sensing, by a second temperature sensor, a second temperature of a heating member, the heating member comprising a plurality of heat generators and contacting an inner circumferential surface of the fusing belt to heat the fusing belt;

sensing, by a third temperature sensor, a third temperature of the outer circumferential surface of the fusing belt or the heating member;

wherein the plurality of heat generators include heating areas, and wherein the heating areas of adjacent heat generators overlap in a direction perpendicular to a horizontal direction of the fuser to form overlap heating areas, wherein the first, second, and third temperature sensors are arranged offset from each other in the horizontal direction of the fuser, the sensing of the first temperature, the sensing of the second temperature, and the sensing of the third temperature are performed in different areas on a horizontal direction of the fuser, wherein the different areas correspond to the heating areas of the plurality of heat generators or an overlap heating area between the heating areas, wherein one of the first and second temperature sensors is located in an area corresponding to a heating area of the heat generators, and the other is located in one of the overlap heating areas between the heating areas of the heat generators;

controlling heat of the heating member and/or transfer of a printing medium to the fuser based on the temperature of the fusing belt, which is obtained by the first temperature sensor.

11. The controlling method of claim 10, wherein the controlling comprises:

controlling heat of the heating member and/or transfer of a printing medium to the fuser based on differences between the temperature of the fusing belt, which is obtained by the first temperature sensor, and the temperature of heating member, which is obtained by the second temperature sensor.

12. The controlling method of claim 10, wherein the controlling comprises:

controlling heating of the heating member and/or transfer of a printing medium to the fuser based on differences between a change rate of the temperature of the fusing belt, which is obtained by the first temperature sensor and a change rate of the temperature of heating member, which is obtained by the second temperature sensor.

* * * * *